US008539933B2

(12) United States Patent
Cowgill et al.

(10) Patent No.: US 8,539,933 B2
(45) Date of Patent: Sep. 24, 2013

(54) MULTIPLE FUEL INJECTION SYSTEMS AND METHODS

(75) Inventors: Joshua D. Cowgill, Hartland, MI (US); J. Michael Ellenberger, Huntington Woods, MI (US); Jonathan T. Shibata, Whitmore Lake, MI (US)

(73) Assignee: GM Global Technology Operations LLC

( * ) Notice: Subject to any disclaimer, the term of this patent is extended or adjusted under 35 U.S.C. 154(b) by 360 days.

(21) Appl. No.: 13/027,531

(22) Filed: Feb. 15, 2011

(65) Prior Publication Data

US 2012/0180763 A1 Jul. 19, 2012

Related U.S. Application Data

(60) Provisional application No. 61/434,105, filed on Jan. 19, 2011.

(51) Int. Cl.
*F02M 43/00* (2006.01)
*F02M 43/04* (2006.01)

(52) U.S. Cl.
USPC .......................................... 123/299; 123/300

(58) Field of Classification Search
USPC ......... 123/299, 300, 304, 478, 472; 701/102, 701/103, 104, 105
See application file for complete search history.

(56) References Cited

U.S. PATENT DOCUMENTS

| | | | |
|---|---|---|---|
| 6,962,140 B1 * | 11/2005 | Nakai et al. .................... | 123/436 |
| 2007/0089704 A1 * | 4/2007 | Jacobsson et al. ............ | 123/299 |
| 2008/0196695 A1 * | 8/2008 | Storhok et al. ................ | 123/478 |
| 2009/0234557 A1 * | 9/2009 | Hirowatari et al. ........... | 701/103 |

* cited by examiner

*Primary Examiner* — Mahmoud Gimie

(57) ABSTRACT

A desired pulse width module determines a desired length of a single pulse of fuel for a combustion cycle of a cylinder of an engine. A multiple pulses module determines a number of pulses (N) for the combustion cycle, wherein N is an integer greater than 1. A fraction determination module determines N fractional values for the N pulses, respectively. An injector control module generates individual lengths for the N pulses based on the N fractional values, respectively, and based on the desired length. A fuel actuator module opens a fuel injector that injects fuel into the cylinder during the combustion cycle in N pulses having the individual lengths, respectively.

20 Claims, 3 Drawing Sheets

MULTIPLE FUEL INJECTION SYSTEMS AND METHODS

CROSS-REFERENCE TO RELATED APPLICATIONS

This application claims the benefit of U.S. Provisional Application No. 61/434,105, filed on Jan. 19, 2011. The disclosure of the above application is incorporated herein by reference in its entirety.

FIELD

The present disclosure relates to internal combustion engines and more particularly to fuel injection control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to generate drive torque for a vehicle. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, injection of the fuel and/or spark provided by a spark plug. Combustion of the air/fuel mixture produces exhaust gas. The exhaust gas is expelled from the cylinders to an exhaust system.

An engine control module (ECM) controls the torque output of the engine. For example only, the ECM controls the torque output of the engine based on driver inputs and/or other inputs. The driver inputs may include, for example, an accelerator pedal position, a brake pedal position, inputs to a cruise control system, and/or other driver inputs. The other inputs may include inputs from various vehicle systems, such as a transmission control system.

SUMMARY

A desired pulse width module determines a desired length of a single pulse of fuel for a combustion cycle of a cylinder of an engine. A multiple pulses module determines a number of pulses (N) for the combustion cycle, wherein N is an integer greater than 1. A fraction determination module determines N fractional values for the N pulses, respectively. An injector control module generates individual lengths for the N pulses based on the N fractional values, respectively, and based on the desired length. A fuel actuator module opens a fuel injector that injects fuel into the cylinder during the combustion cycle in N pulses having the individual lengths, respectively.

A method for a vehicle, includes: determining a desired length of a single pulse of fuel for a combustion cycle of a cylinder of an engine; determining a number of pulses (N) for the combustion cycle, wherein N is an integer greater than 1; determining N fractional values for the N pulses, respectively; generating individual lengths for the N pulses based on the N fractional values, respectively, and based on the desired length; and opening a fuel injector that injects fuel into the cylinder during the combustion cycle in N pulses having the N individual lengths, respectively.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
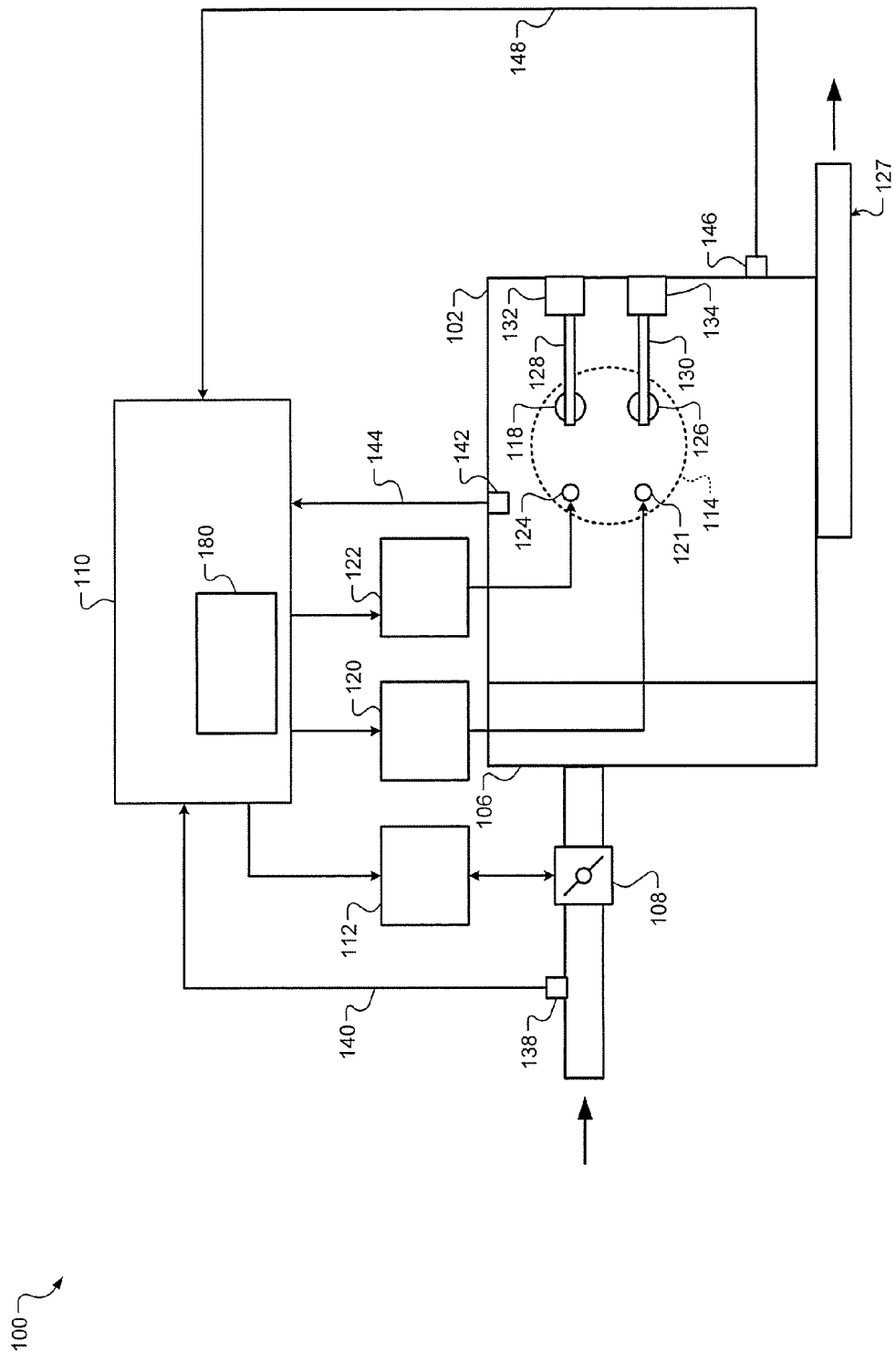
FIG. 1 is a functional block diagram of an example implementation of an engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine combusts an air/fuel mixture within a cylinder to produce drive torque for a vehicle. An engine control module (ECM) controls injection of fuel into the cylinder for a combustion cycle of the cylinder. The ECM also controls spark timing for the combustion cycle of the cylinder. Generally, fuel is injected for a given combustion cycle in a single pulse having a desired length (also referred to as a desired pulse width).

Under some circumstances, injecting fuel using a single pulse may increase an amount of particulate matter exhausted from the engine. For example only, fuel injected in a single pulse may only be partially burned under some circumstances, and the unburned fuel may increase the amount of particulate matter exhausted from the engine. The amount of particulate matter exhausted from the engine may also increase when injected fuel is deposited on one or more cylinder walls and/or the face of a piston within the cylinder. Injected fuel may be deposited on one or more surfaces of the cylinder under some circumstances when a single pulse is used.

The ECM of the present disclosure selectively splits a single pulse of fuel into multiple individual pulses for a combustion cycle. The ECM determines the number of individual pulses, the length of each of the individual pulses, and when each of the pulses should start. The ECM selectively controls the injection of fuel into the cylinder for the combustion cycle in the individual pulses to reduce the amount of particulate matter exhausted from the engine.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another suitable type of engine. One or more electric motors and/or motor generator units (MGUs) may be used with the engine 102.

Air is drawn into an intake manifold 106 through a throttle valve 108. The throttle valve 108 varies airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through one or more intake valves, such as intake valve 118.

The ECM 110 controls a fuel actuator module 120, and the fuel actuator module 120 controls opening of a fuel injector 121. The fuel injector 121 injects fuel into the cylinder 114. Fuel is provided to the fuel injector 121 by a low pressure fuel pump and a high pressure fuel pump (not shown). The low pressure fuel pump draws fuel from a fuel tank and provides fuel at low pressures to the high pressure fuel pump. The high pressure fuel pump selectively further pressurizes the fuel, for example, for direct injection into the cylinders of the engine 102.

The injected fuel mixes with air and creates an air/fuel mixture in the cylinder 114. A piston (not shown) within the cylinder 114 compresses the air/fuel mixture. Based upon a signal from the ECM 110, a spark actuator module 122 energizes a spark plug 124 in the cylinder 114. Spark generated by the spark plug 124 ignites the air/fuel mixture. The timing of the spark may be specified relative to the time when the piston is at its topmost position, referred to as top dead center (TDC).

The combustion of the air/fuel mixture drives the piston down, and the piston drives a crankshaft (not shown). The piston begins moving up again and expels the byproducts of combustion through one or more exhaust valves, such as exhaust valve 126. The byproducts of combustion are exhausted from the vehicle via an exhaust system 127.

One combustion cycle, from the standpoint of the cylinder 114, may include two revolutions of the crankshaft (i.e., 720° of crankshaft rotation). One combustion cycle for the cylinder 114 includes four phases: an intake phase; a compression phase; an expansion phase; and an exhaust phase. For example only, the piston lowers toward the BDC position and air is drawn into the cylinder 114 during the intake phase. The piston rises toward the TDC position and compresses the contents of the cylinder 114 during the compression phase. Fuel may be injected into the cylinder 114 during the compression phase. Fuel injection may also occur during the expansion phase. Combustion drives the piston toward the BDC position during the expansion phase. The piston rises toward the TDC position to expel the resulting exhaust gas from the cylinder 114 during the exhaust phase. One engine cycle may refer to each of the cylinders undergoing one complete combustion cycle.

The intake valve 118 may be controlled by an intake camshaft 128, while the exhaust valve 126 may be controlled by an exhaust camshaft 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The time at which the intake valve 118 is opened may be varied with respect to the TDC position by an intake cam phaser 132. The time at which the exhaust valve 126 is opened may be varied with respect to the TDC position by an exhaust cam phaser 134. Fuel injection timing may also be specified relative to the position of the piston.

A mass air flowrate (MAF) sensor 138 measures a mass flowrate of air through the throttle valve 108 and generates a MAF 140 signal based on the measurement. An engine coolant temperature sensor 142 measures temperature of engine coolant and generates a coolant temperature signal 144 based on the temperature. While the engine coolant temperature sensor 142 is shown as being implemented within the engine 102, the engine coolant temperature sensor 142 may be implemented in another suitable location.

A crankshaft position sensor 146 monitors rotation of the crankshaft and generates a crankshaft position signal 148 based on the rotation of the crankshaft. For example only, the crankshaft sensor 146 may include a variable reluctance (VR) sensor or another suitable type of crankshaft position sensor. The crankshaft position signal 148 may include a pulse train. Each pulse of the pulse train may be generated as a tooth of an N-toothed wheel (not shown) that rotates with the crankshaft, passes the crankshaft position sensor 146. Accordingly, each pulse corresponds to an angular rotation of the crankshaft by an amount equal to 360° divided by N teeth. The N-toothed wheel may also include a gap of one or more missing teeth, and the gap may be used as an indicator of one complete revolution of the crankshaft (i.e., 360° of crankshaft rotation).

The ECM 110 includes a fuel control module 180 that controls the amount (e.g., mass) of fuel injected into the cylinder 114 for a combustion cycle of the cylinder 114. For example only, the fuel control module 180 controls a period that the fuel injector 121 is maintained in a fully open position for a combustion cycle. The period that the fuel injector 121 is to be maintained in the fully open position for an injection of fuel may be referred to as an injection pulse width. The fuel control module 180 may vary the injection pulse width to control the amount of fuel injected into the cylinder 114. The fuel control module 180 also controls the timing of the fuel injection.

For example only, the fuel control module 180 determines a desired equivalence ratio (EQR) for the combustion cycle of the cylinder 114. An equivalence ratio of a fuel injection event may refer to a ratio between a desired air/fuel ratio of the combustion cycle and a stoichiometric air/fuel ratio. The fuel control module 180 determines a desired mass of fuel to inject into the cylinder 114 to achieve the desired EQR under the current operating conditions. The fuel control module 180 determines a desired injection pulse width for the combustion cycle based on the desired mass.

Under some circumstances, injecting the desired mass of fuel in one single pulse (having a desired injection pulse width) may cause greater particulate emissions than desired. For example only, injecting the desired mass of fuel in one pulse may cause greater particulate emissions than desired under some circumstances when the engine 102 is cold, when engine load is high, and/or during transient operating conditions. Injecting the desired mass of fuel in multiple pulses may provide a reduced level of particulate emissions relative to using one single pulse.

For a given combustion cycle of the cylinder 114, the fuel control module 180 splits the single pulse into multiple individual pulses. The fuel control module 180 also determines a fraction of the desired injection pulse width for each of the individual pulses and an injection start timing for each of the pulses. The fuel control module 180 controls the injection of fuel into the cylinder 114 in the multiple individual pulses during the combustion cycle of the cylinder 114.

Figure 2:
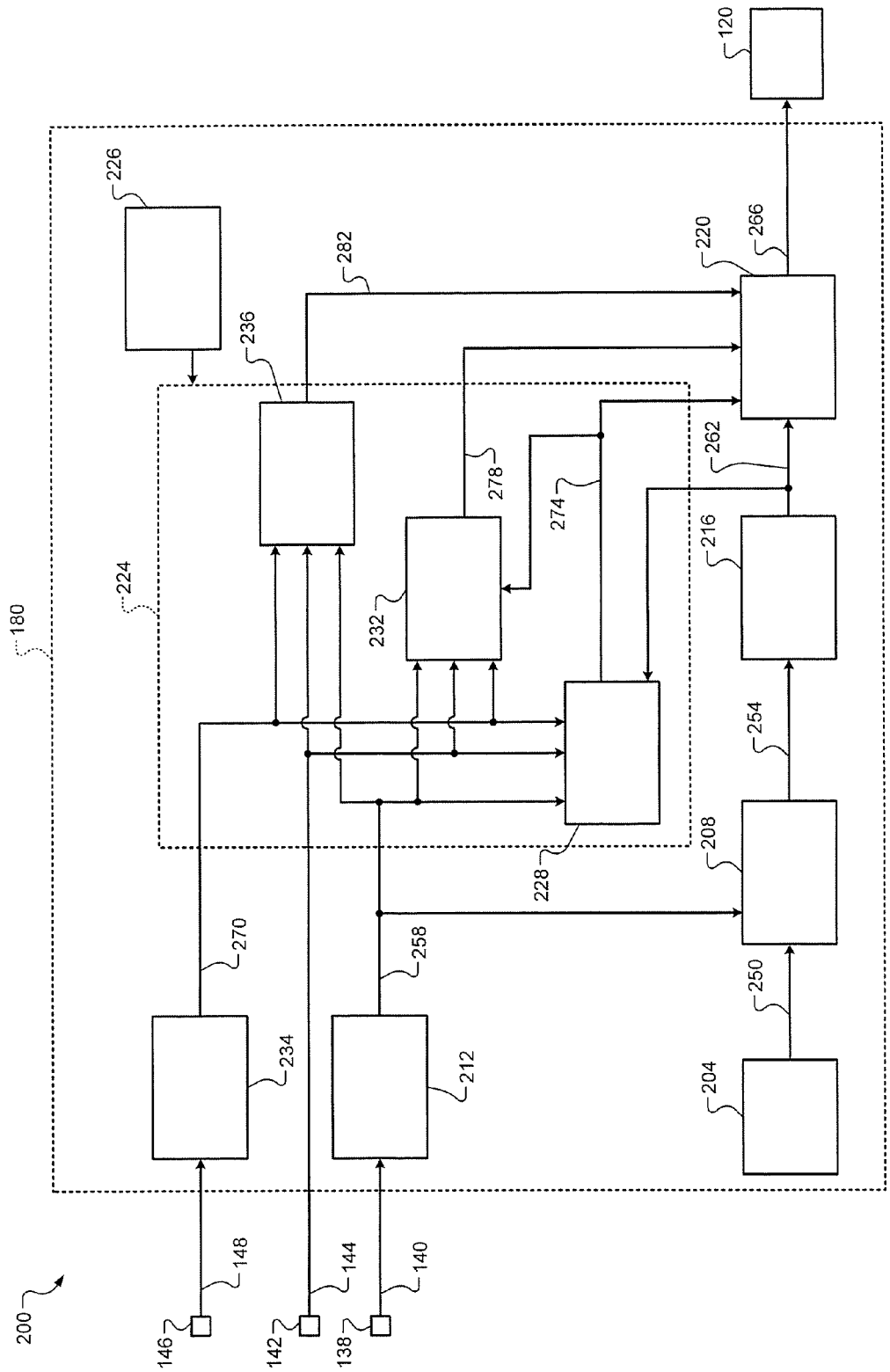
FIG. 2 is a functional block diagram of an example implementation of a fuel control system according to the present disclosure.

Referring now to FIG. 2, a functional block diagram of an example fuel control system 200 is presented. The fuel control module 180 may include a desired EQR module 204, a desired fuel mass module 208, an air per cylinder (APC) determination module 212, a desired pulse width module 216, an injection control module 220, a multiple injection module 224, and an enabling module 226. The multiple injection module 224 may include a multiple pulses module 228, a fraction determination module 232, and a timing determination module 236.

The desired EQR module 204 determines a desired EQR 250 for a combustion cycle of the cylinder 114. Generally, the desired EQR module 204 may set the desired EQR 250 to the stoichiometric EQR. However, the desired EQR module 204 may change the desired EQR 250 under one or more circumstances. For example only, the desired EQR module 204 may change the desired EQR 250 based on a request for a catalyst diagnostic and/or one or more other circumstances.

The desired fuel mass module 208 determines a desired fuel mass 254 for the combustion cycle of the cylinder 114 based on the desired EQR 250. The desired fuel mass module 208 may determine the desired fuel mass 254 further based on one or more other parameters, such as a mass of air per cylinder (APC) 258 and an air temperature. The APC determination module 212 may determine the APC 258 based on the MAF 140 and/or one or more other suitable parameters.

The desired pulse width module 216 determines a desired pulse width 262 for the combustion cycle of the cylinder 114 based on the desired fuel mass 254. The injector control module 220 selectively outputs fueling parameters 266 for the combustion cycle of the cylinder to the fuel actuator module 120. For example only, the fueling parameters 266 may include a desired start timing during the combustion cycle and the desired pulse width 262. The desired start timing may be, for example, a crankshaft position for transitioning the fuel injector 121 to the fully open state. The desired start timing may be a predetermined value or a variable value. The fuel actuator module 120 controls fuel injection into the cylinder 114 based on the fueling parameters 266.

When enabled, the multiple injection module 224 determines how the single pulse of the desired pulse width 262 should be divided into multiple individual pulses. For example only, the multiple injection module 224 determines how many individual pulses the single pulse having the desired pulse width 262 should be divided into. The multiple injection module 224 also determines how much of the desired pulse width 262 should be attributed to each of the individual pulses, and start timings for each of the individual pulses.

The enabling module 226 selectively enables and disables the multiple injection module 224. The enabling module 226 may enable and disable the multiple injection module 224 based on the APC 258 (or another suitable indicator of engine load), the coolant temperature 144, an engine speed 270, and/or one or more other suitable parameters. The engine speed determination module 234 may determine the engine speed 270 based on the crankshaft position 148.

For example only, the enabling module 226 may selectively enable the multiple injection module 224 when the coolant temperature 144 is less than a predetermined temperature. The enabling module 226 may additionally or alternatively selectively enable the multiple injection module 224 when a magnitude of a change in the engine load (or the APC 258) over a predetermined period is greater than a predetermined amount. The enabling module 226 may additionally or alternatively selectively enable the multiple injection module 224 when the engine load is greater than a predetermined value.

The enabling module 226 may disable the multiple injection module 224 when a boost voltage of the ECM 110 is less than a predetermined value. The boost voltage may be a voltage greater than 12 Volts and may be used, for example, in opening the fuel injector 121. The enabling module 226 may additionally or alternatively selectively disable the multiple injection module 224 when the engine speed 270 is greater than a predetermined speed. The enabling module 226 may disable the multiple injection module 224 when the desired pulse width 262 is less than two times a predetermined minimum pulse width. The predetermined minimum pulse width may be a minimum pulse width for an injection of fuel. The predetermined minimum pulse width may also include a predetermined offtime period for between two successive pulses in various implementations.

The multiple pulses module 228 determines a number of individual pulses 274 for the combustion cycle of the cylinder 114 based on the desired pulse width 262 for the combustion cycle. The multiple pulses module 228 determines the number of individual pulses 274 further based on the coolant temperature 144, the APC 258, and/or the engine speed 270. The number of individual pulses 274 is an integer greater than one.

For example only, the multiple pulses module 228 may selectively increase the number of individual pulses 274 as the coolant temperature decreases. Additionally or alternatively, the multiple pulses module 228 may selectively increase the number of individual pulses 274 as the APC 258 increases. Additionally or alternatively, the multiple pulses module 228 may selectively decrease the number of individual pulses 274 as the engine speed increases. The multiple pulses module 228 may limit the number of individual pulses 274 to a maximum number of pulses capable of being performed during the desired pulse width 262 with each of the individual pulses having at least the predetermined minimum pulse width. For example only, the maximum number may be equal to the desired pulse width 262 divided by the predetermined minimum pulse width, rounding down to the nearest integer. The multiple pulses module 228 may also apply hysteresis as to avoid making back and forth changes in the number of individual pulses 274.

The fraction determination module 232 determines fractions 278 for each of the individual pulses. For example only, the fractions 278 may each be a value between 0.01 and 0.99, inclusive, where a sum of the fractions 278 is equal to 1.0. The fractions 278 may be the same for each of the individual pulses or one or more of the fractions 278 may be different from one another. For example only, an earliest one of the individual pulses in a combustion cycle may be a largest pulse (and therefore have a largest fraction).

The fraction determination module 232 may determine the fractions 278, for example, based on the coolant temperature 144, the APC 258, and/or the engine speed 270. For example only, the fraction determination module 232 may selectively increase the fraction 278 for the earliest one of the individual pulses as the engine speed 270 increases. Additionally or alternatively, the fraction determination module 232 may selectively increase the fraction 278 for the earliest one of the pulses as the APC 258 increases. Additionally or alternatively, the fraction determination module 232 may selectively decrease the fraction 278 for the earliest one of the pulses as the coolant temperature 144 decreases.

The fraction determination module 232 may determine the fractions 278 further based on the number of individual pulses 274. For example only, the fraction determination module 232 may set the fractions 278 such that none of the individual pulses are less than the predetermined minimum pulse width.

The timing determination module 236 determines the start timings 282 for the individual pulses, respectively. The timing determination module 236 may determine the start timings 282 based on the coolant temperature 144, the APC 258, and/or the engine speed 270. For example only, the timing determination module 236 may selectively increase a period between each of the start timings 282 as the engine speed 270 increases. Additionally or alternatively, the timing determination module 236 may selectively increase the period between each of the start timings 282 as the APC 258 increases. Additionally or alternatively, the timing determination module 236 may selectively decrease the period between each of the start timings 282 as the coolant temperature 144 decreases. The timing determination module 236 may favor setting the start timings 282 toward the start of the combustion cycle (and more particularly when the intake valve 118 is closed).

The number of individual pulses 274, the fractions 278, and the start timings 282 are provided to the injection control module 220. Instead of outputting the fueling parameters 266 to inject fuel into the cylinder 114 in a single pulse of the desired pulse width 262, the injection control module 220 generates the fueling parameters 266 based on the number of individual pulses 274, the fractions 278, and the start timings 282. The fueling parameters 266 may include the start timings 282 for the individual pulses, respectively, and individual pulse widths for the individual pulses, respectively. The injection control module 220 may set the individual pulse widths for the individual pulses based on the desired pulse width 262 and the fractions 278 for the individual pulses, respectively. For example only, the injection control module 220 may set the individual pulse width for a given individual pulse equal to the product of the one of the fractions 278 for the given individual pulse and the desired pulse width 262.

The fuel actuator module 120 controls opening and closing of the fuel injector 121 during the combustion cycle of the cylinder 114 according to the start timings 282 and the individual pulse widths. In this manner, instead of the fuel for the combustion cycle being injected in one pulse with a length of the desired pulse width 262, the fuel is injected into the cylinder 114 in multiple individual pulses with lengths of the individual pulse widths starting at the start timings 282, respectively. The fuel actuator module 120 closes the fuel injector 121 for a period between the end of one of the individual pulses and the beginning of a next one of the individual pulses.

Figure 3:
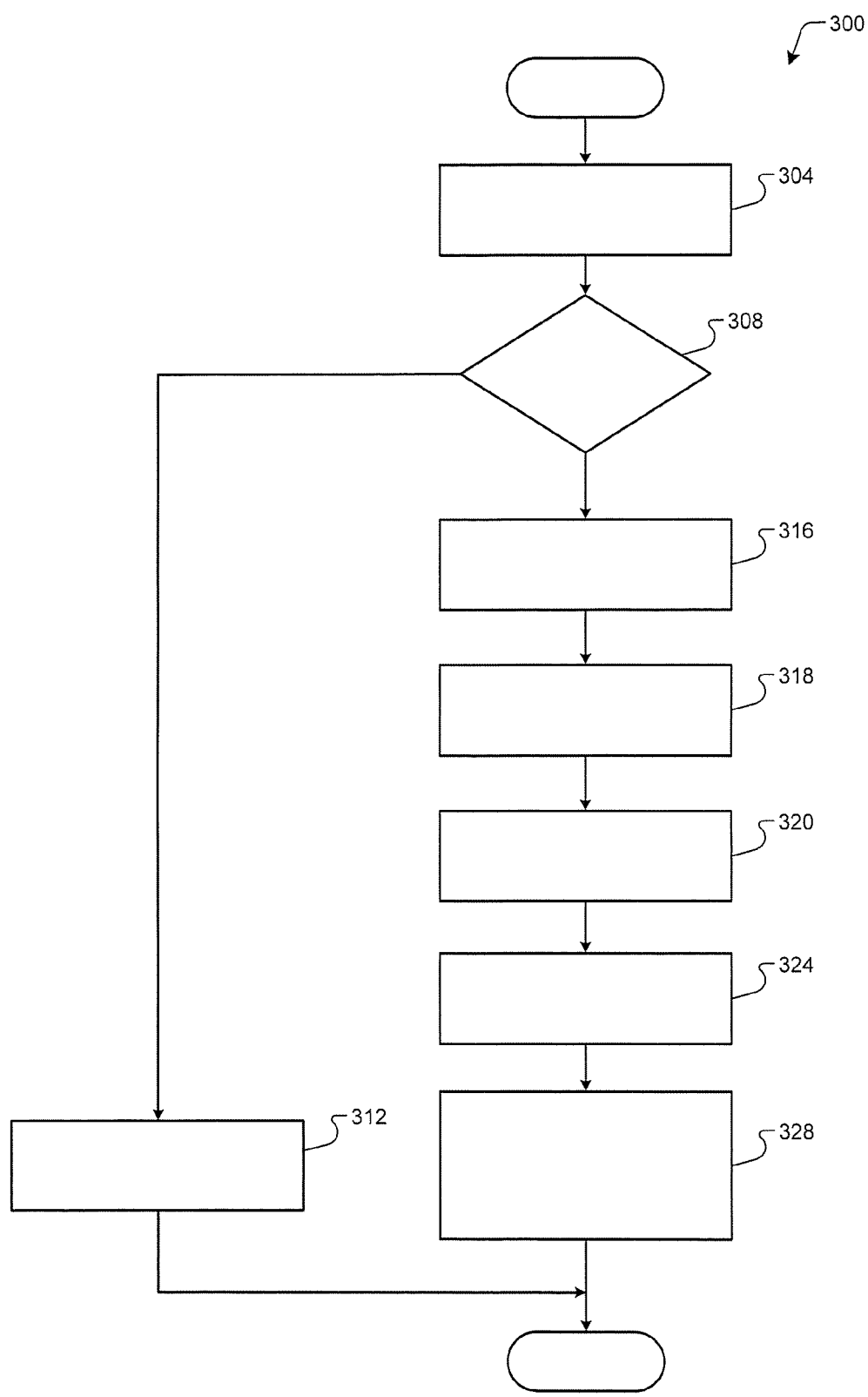
FIG. 3 is a flowchart depicting an example method of controlling fuel injection according to the present disclosure.

Referring now to FIG. 3, a flowchart depicting an example method 300 of controlling fuel injection is presented. Control begins with 304 where control generates the desired pulse width 262 for one pulse of fuel for a combustion cycle of the cylinder 114. Control determines whether to split the one pulse into multiple individual pulses at 308. If false, control injects the fuel into the cylinder 114 in one pulse with a length of the desired pulse width 262 at 312, and control may end. If true, control continues with 316.

At 316, control determines the number of individual pulses 274 for the combustion cycle. Control may determine the number of individual pulses 274 based on the coolant temperature 144, the APC 258, and/or the engine speed 270. Control may limit the number of individual pulses 274 based on the predetermined minimum pulse width.

Control determines the fractions 278 for the individual pulses, respectively, at 318. Control may determine the fractions 278 based on the coolant temperature 144, the APC 258, and/or the engine speed 270. Control may determine the fractions 278 further based on the number of individual pulses 274. Control determines the start timings 282 for the individual pulses, respectively, at 320. Control may determine the start timings 282 based on the coolant temperature 144, the APC 258, and/or the engine speed 270.

At 324, control determines the individual pulse widths for the individual pulses, respectively. Control determines the individual pulse widths based on the desired pulse width 262 for the one pulse and the fractions 278, respectively. At 328, control injects the fuel into the cylinder 114 for the combustion cycle in multiple individual pulses having lengths of the individual pulse widths and starting at the start timings 282, respectively.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a desired pulse width module that determines a desired length of a single pulse of fuel for a combustion cycle of a cylinder of an engine;
a multiple pulses module that determines a number of pulses (N) for the combustion cycle, wherein N is an integer greater than 1;
a fraction determination module that determines N fractional values for the N pulses, respectively;
an injector control module that, generates individual lengths for the N pulses based on the N fractional values, respectively, and based on the desired length; and
a fuel actuator module that opens a fuel injector that injects fuel into the cylinder during the combustion cycle in N pulses having the individual lengths, respectively.

2. The system of claim 1 wherein the multiple pulses module determines the number of pulses based on engine speed, air per cylinder (APC), and coolant temperature.

3. The system of claim 2 wherein the multiple pulses module selectively increases the number of pulses as the engine speed decreases.

4. The system of claim 2 wherein the multiple pulses module selectively increases the number of pulses as the APC increases.

5. The system of claim 2 wherein the multiple pulses module selectively increases the number of pulses as the coolant temperature decreases.

6. The system of claim 1 wherein the fraction determination module determines the fractional values based on engine speed, air per cylinder (APC), and coolant temperature.

7. The system of claim 1 further comprising a timing determination module that determines N start timings for the N pulses, respectively,
wherein the fuel actuator module transitions the fuel injector to an open state at the N start timings and maintains the fuel injector in the open state for the individual lengths, respectively.

8. The system of claim 7 wherein the timing determination module determines the start timings based on engine speed, air per cylinder (APC), and coolant temperature.

9. The system of claim 1 wherein a sum of the individual lengths is equal to the desired length.

10. The system of claim 1 further comprising an enabling module that disables the multiple pulses module and the fraction determination module when the desired length is less than a product of 2 and a predetermined minimum length,
wherein, when the multiple pulses and fraction determination modules are disabled, the fuel actuator module injects fuel into the cylinder during the combustion cycle in the single pulse having the desired length.

11. A method for a vehicle, comprising:
determining a desired length of a single pulse of fuel for a combustion cycle of a cylinder of an engine;
determining a number of pulses (N) for the combustion cycle, wherein N is an integer greater than 1;
determining N fractional values for the N pulses, respectively;
generating individual lengths for the N pulses based on the N fractional values, respectively, and based on the desired length; and
opening a fuel injector that injects fuel into the cylinder during the combustion cycle in N pulses having the N individual lengths, respectively.

12. The method of claim 11 further comprising determining the number of pulses based on engine speed, air per cylinder (APC), and coolant temperature.

13. The method of claim 12 further comprising selectively increasing the number of pulses as the engine speed decreases.

14. The method of claim 12 further comprising selectively increasing the number of pulses as the APC increases.

15. The method of claim 12 further comprising selectively increasing the number of pulses as the coolant temperature decreases.

16. The method of claim 11 further comprising determining the fractional values based on engine speed, air per cylinder (APC), and coolant temperature.

17. The method of claim 11 further comprising:
determining N start timings for the N pulses, respectively;
transitioning the fuel injector to an open state at the start timings; and
maintaining the fuel injector in the open state for the individual lengths, respectively.

18. The method of claim 17 further comprising determining the start timings based on engine speed, air per cylinder (APC), and coolant temperature.

19. The method of claim 11 wherein a sum of the individual lengths is equal to the desired length.

20. The method of claim 11 further comprising:
disabling the determining the number of pulses, the determining the fractional values, and the generating the individual lengths when the desired length is less than a product of 2 and a predetermined minimum length; and
injecting fuel into the cylinder during the combustion cycle in the single pulse having the desired length.

* * * * *